(12) United States Patent
Adachi et al.

(10) Patent No.: US 10,834,785 B2
(45) Date of Patent: Nov. 10, 2020

(54) RADIO TERMINAL AND BASE STATION FOR CONTROLLING DIRECT COMMUNICATION BETWEEN RADIO TERMINALS

(71) Applicant: KYOCERA CORPORATION, Kyoto (JP)

(72) Inventors: Hiroyuki Adachi, Kawasaki (JP); Masato Fujishiro, Yokohama (JP); Takahiro Saiwai, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 64 days.

(21) Appl. No.: 15/751,687

(22) PCT Filed: Aug. 8, 2016

(86) PCT No.: PCT/JP2016/073297
§ 371 (c)(1),
(2) Date: Feb. 9, 2018

(87) PCT Pub. No.: WO2017/026443
PCT Pub. Date: Feb. 16, 2017

(65) Prior Publication Data
US 2018/0235027 A1    Aug. 16, 2018

(30) Foreign Application Priority Data

Aug. 11, 2015 (JP) .................. 2015-158904

(51) Int. Cl.
*H04W 92/18* (2009.01)
*H04W 72/12* (2009.01)
(Continued)

(52) U.S. Cl.
CPC .......... *H04W 92/18* (2013.01); *H04W 8/005* (2013.01); *H04W 72/0406* (2013.01);
(Continued)

(58) Field of Classification Search
None
See application file for complete search history.

(56) References Cited

U.S. PATENT DOCUMENTS

2012/0149296 A1   6/2012  Sawai
2014/0003319 A1   1/2014  Etemad
(Continued)

FOREIGN PATENT DOCUMENTS

| | | |
|---|---|---|
| JP | 2011-091786 A | 5/2011 |
| JP | 2015-518361 A | 6/2015 |
| WO | 2014/115406 A1 | 7/2014 |

OTHER PUBLICATIONS

International Search Report issued in PCT/JP2016/073297; dated Oct. 18, 2016.
(Continued)

*Primary Examiner* — Donald L Mills
(74) *Attorney, Agent, or Firm* — Studebaker & Brackett PC

(57) ABSTRACT

A radio terminal according to an embodiment is configured to perform direct communication with another radio terminal. The radio terminal comprises a controller configured to receive first data addressed to said another radio terminal from a base station. When the controller receives the first data from the base station, the controller is configured to also receive information indicating a first radio resource used for transferring the first data to said another radio terminal by the direct communication.

9 Claims, 9 Drawing Sheets

(51) Int. Cl.
*H04W 76/14* (2018.01)
*H04W 8/00* (2009.01)
*H04W 72/04* (2009.01)
H04W 88/04 (2009.01)
H04W 28/02 (2009.01)

(52) U.S. Cl.
CPC ....... *H04W 72/1278* (2013.01); *H04W 76/14* (2018.02); *H04W 28/0278* (2013.01); *H04W 72/121* (2013.01); *H04W 88/04* (2013.01)

(56) References Cited

U.S. PATENT DOCUMENTS

| | | | |
|---|---|---|---|
| 2015/0110038 A1* | 4/2015 | Yang | H04W 72/048 370/329 |
| 2015/0373701 A1 | 12/2015 | Furuichi et al. | |
| 2016/0135217 A1* | 5/2016 | Lee | H04L 47/30 370/329 |
| 2017/0215175 A1* | 7/2017 | Kim | H04L 5/0032 |
| 2017/0339671 A1* | 11/2017 | Lee | H04W 72/0446 |
| 2018/0069618 A1* | 3/2018 | Loehr | H04B 7/15542 |
| 2018/0098249 A1* | 4/2018 | Lee | H04W 36/0011 |
| 2018/0116007 A1* | 4/2018 | Yasukawa | H04W 28/06 |
| 2018/0146478 A1* | 5/2018 | Kim | H04W 76/14 |

OTHER PUBLICATIONS

3rd Generation Partnership Project; Technical Specification Group Services and System Aspects; Proximity-based services (ProSe); 3GPP TS 23.303 V13.0.0; Jun. 2015; pp. 1-76; Release 13; 3GPP Organizational Partners.

\* cited by examiner

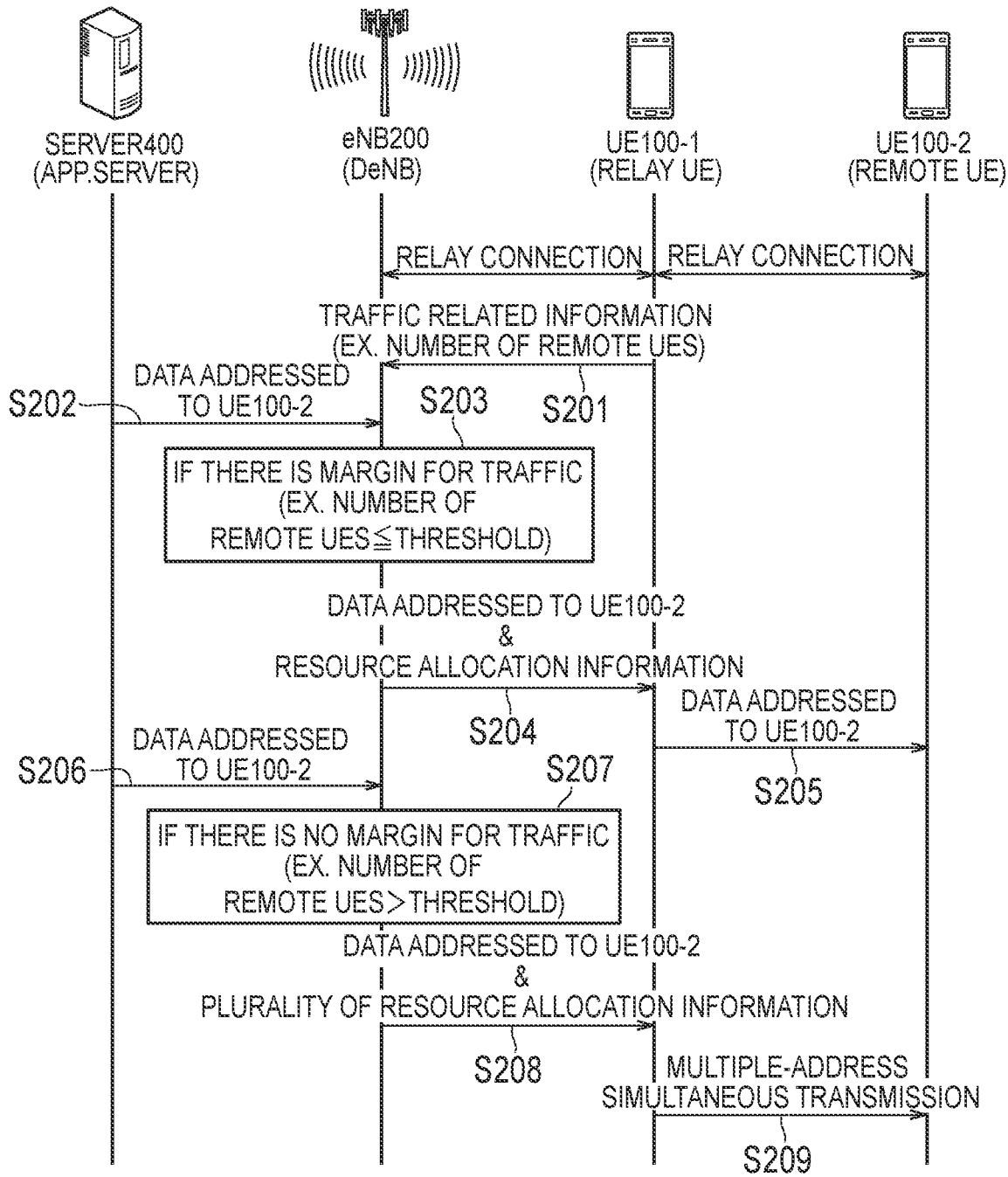

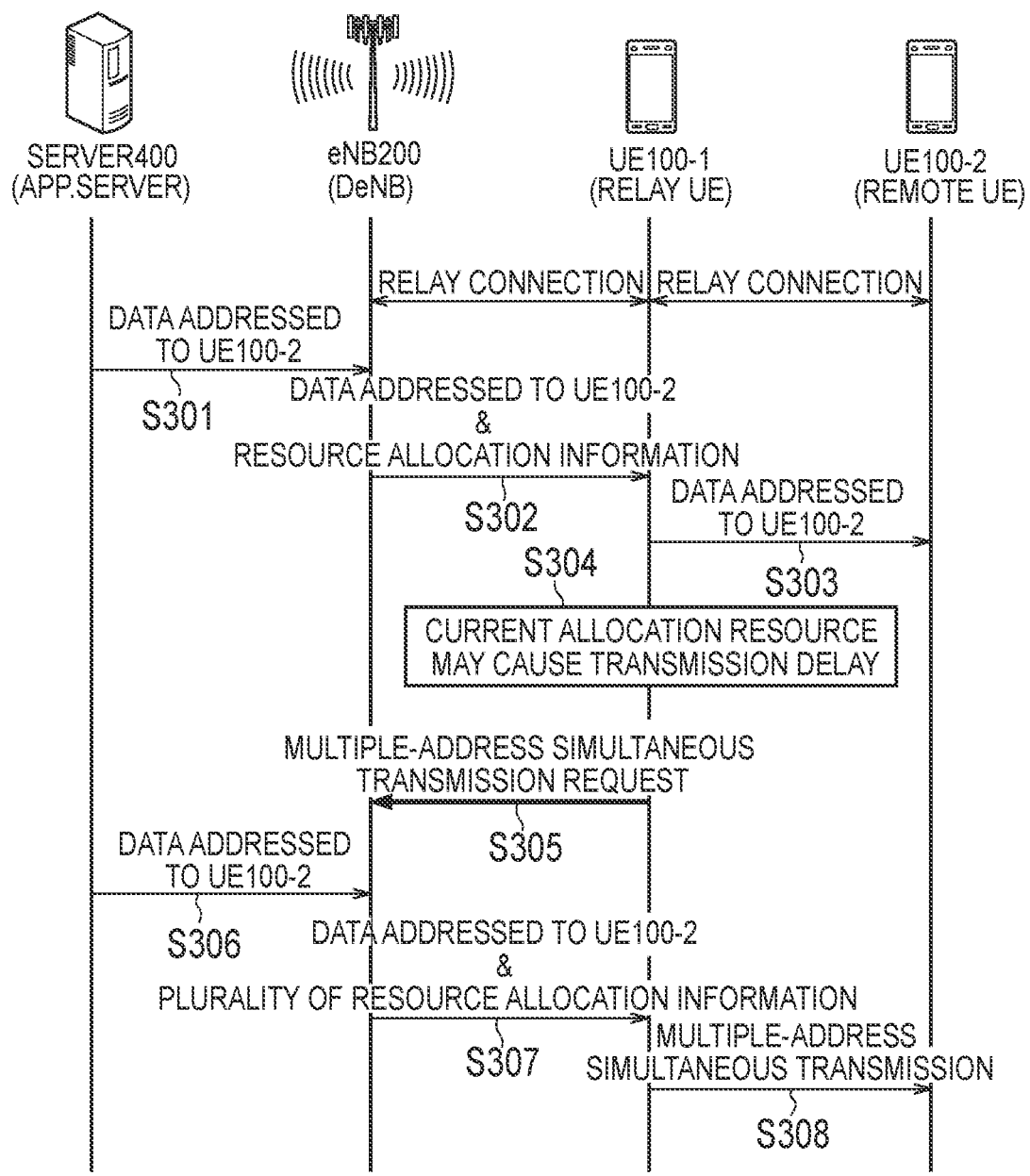

US 10,834,785 B2

RADIO TERMINAL AND BASE STATION FOR CONTROLLING DIRECT COMMUNICATION BETWEEN RADIO TERMINALS

TECHNICAL FIELD

The present application relates to a radio terminal and a base station used in a communication system.

BACKGROUND ART

In 3GPP (3rd Generation Partnership Project), which is a project aiming to standardize a mobile communication system, the specifications of a proximity service (ProSe: Proximity-based Service) have been designed.

Here, the ProSe includes a UE-to-Network relay (transfer) in which a first radio terminal (ProSe UE-to-Network Relay) relays (transfers) data (traffic) of a second radio terminal between the second radio terminal (Remote UE) which is outside a network and the network.

PRIOR ART DOCUMENT

Non-Patent Document

Non Patent Document 1: 3GPP Technical Report "TS 23.303 V13. 0. 0" Jun. 21, 2015

SUMMARY OF THE INVENTION

A radio terminal according to an embodiment is configured to perform direct communication with another radio terminal. The radio terminal comprising a controller configured to receive first data addressed to said another radio terminal from a base station. When the controller receives the first data from the base station, the controller is configured to also receive information indicating a first radio resource used for transferring the first data to said another radio terminal by the direct communication.

A base station according to an embodiment may comprise a controller configured to transmit data to a first radio terminal, the data being addressed to a second radio terminal capable of performing direct communication with the first radio terminal. When transmitting the data to the first radio terminal, the controller may also transmit information on a radio resource which is used so that the first radio terminal transfers the data to the second radio terminal by the direct communication.

A radio terminal according to an embodiment is a radio terminal configured to perform direct communication with another radio terminal. The radio terminal may comprise a controller configured to transmit data to one address by the direct communication within a predetermined period. The predetermined period may be configured to include a period for transmitting control information used for the direct communication and a period for transmitting data corresponding to the control information, and if there is data to be transmitted to a plurality of addresses by the direct communication, the controller may be configured to request a base station for permission to transmit the data to the plurality of addresses.

A base station according to an embodiment may comprises a controller configured to receive a request for permission to transmit data to a plurality of addresses by direct communication from a radio terminal configured to transmit data to one address by direct communication within a predetermined period. The predetermined period is configured to include a period for transmitting control information used for the direct communication between radio terminals and a period for transmitting data corresponding to the control information. The controller determines whether to permit data transmission by the radio terminal to the plurality of addresses by the direct communication based on the request for the permission.

BRIEF DESCRIPTION OF DRAWINGS

FIG. 10 is a sequence diagram for describing a modification according to the first embodiment.

FIG. 11 is a sequence diagram for describing operations according to a second embodiment.

DESCRIPTION OF THE EMBODIMENT

Overview of Embodiment

Figure 1:
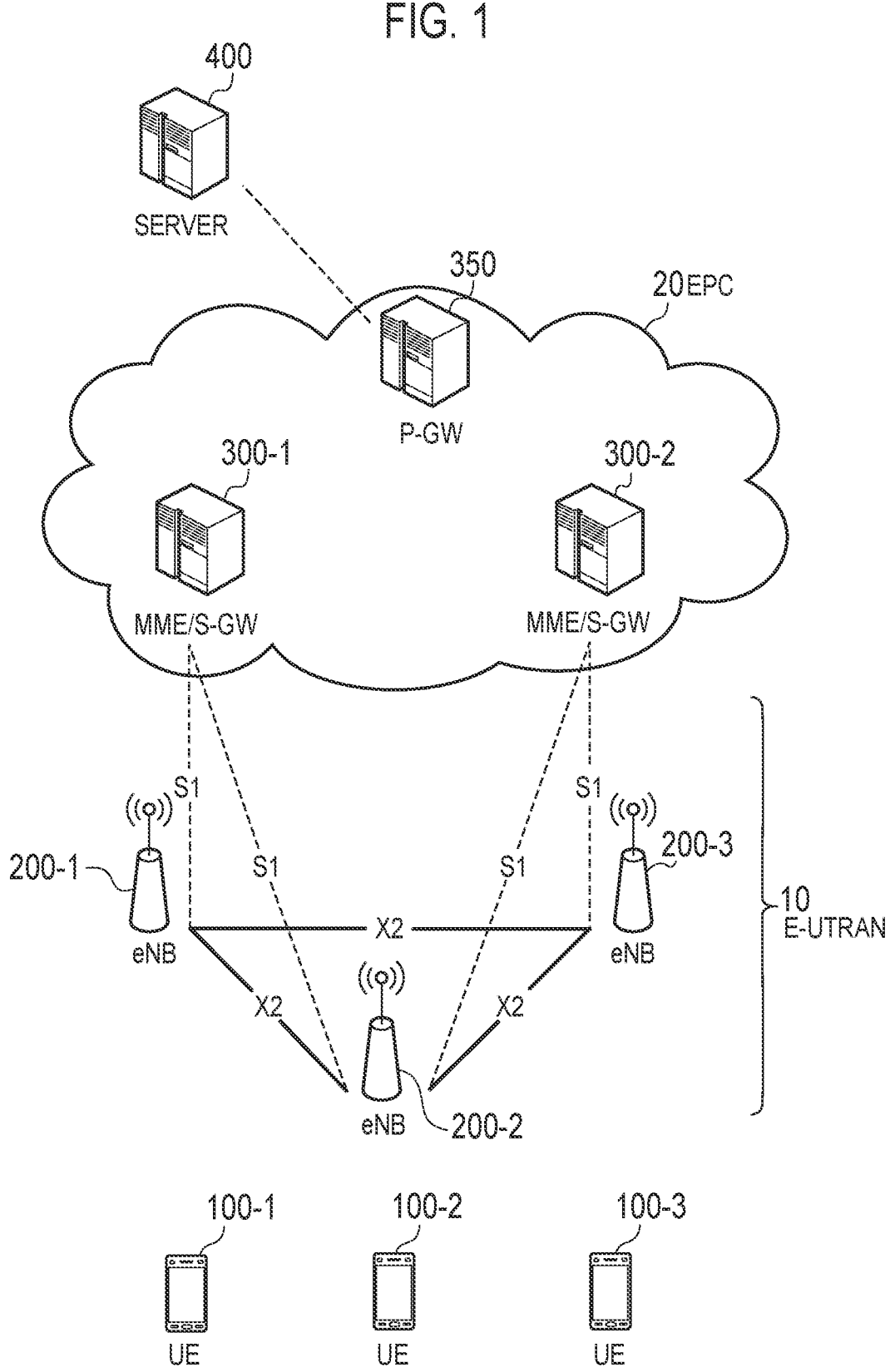
FIG. 1 is a view illustrating a configuration of an LTE system.

A radio terminal according to an embodiment is configured to perform direct communication with another radio terminal. The radio terminal comprising a controller configured to receive first data addressed to said another radio terminal from a base station. When the controller receives the first data from the base station, the controller is configured to also receive information indicating a first radio resource used for transferring the first data to said another radio terminal by the direct communication.

The controller may be configured to receive information indicating the first radio resource from the base station together with the data by a physical downlink shared channel.

The controller may be configured to receive, from the base station, information indicating a second radio resource used for transmitting second data addressed to said another radio terminal, and the controller is configured to receive information indicating the first radio resource at a timing when a period from reception of the information indicating the first radio resource to start of transmission of the first data becomes longer than a period from reception of the information indicating the second radio resource to start of transmission of the second data.

The controller also may be receive permission information permitting data transmission to a plurality of addresses by the direct communication within a predetermined period when receiving the first data from the base station. The predetermined period is configured to include a period for transmitting control information used for the transfer and a period for transmitting data corresponding to the control information.

The permission information may be information indicating a third radio resource used for data transmission to the plurality of addresses.

Before receiving the permission information, the controller may be configured to transmit, to the base station, at least one of the number of said another radio terminal, the number of identifiers of addresses being transferring destination, types of data to be transferred, and traffic volume related to transfer.

The controller may be configured to transmit a buffer status report to the base station, the buffer status report indicating volume of data transmittable by the direct communication to said another radio terminal, and the controller may be configured not to include volume of the first data received from the base station in the volume of data transmittable by the direct terminal-to-terminal communication.

A base station according to an embodiment may comprise a controller configured to transmit data to a first radio terminal, the data being addressed to a second radio terminal capable of performing direct communication with the first radio terminal. When transmitting the data to the first radio terminal, the controller may also transmit information on a radio resource which is used so that the first radio terminal transfers the data to the second radio terminal by the direct communication.

The controller also may be configured to transmit permission information permitting data transmission to a plurality of addresses within a predetermined period when transmitting the data to the first radio terminal. The predetermined period may be configured to include a period for transmitting control information used for the direct communication and a period for transmitting data corresponding to the control information.

The controller may be configured to receive, from the first radio terminal, at least one of the number of the second radio terminal, the number of identifiers of addresses being transferring destination, types of data to be transferred, and traffic volume related to transfer. The controller may be configured to transmit the permission information based on the information.

Incidentally, direct communication (Direct Communication) is defined as one of D2D ProSe. The radio terminal can transmit data by direct communication using radio resources in the transmission resource pool.

A radio terminal according to an embodiment is a radio terminal configured to perform direct communication with another radio terminal. The radio terminal may comprise a controller configured to transmit data to one address by the direct communication within a predetermined period. The predetermined period may be configured to include a period for transmitting control information used for the direct communication and a period for transmitting data corresponding to the control information, and if there is data to be transmitted to a plurality of addresses by the direct communication, the controller may be configured to request a base station for permission to transmit the data to the plurality of addresses.

The controller may be configured to start data transmission to the plurality of addresses within the predetermined period if the controller receives the permission from the base station.

The controller may be configured to request the base station for the permission if the controller transfers data received from the base station to said another radio terminal by the direct communication.

The controller may be configured to request the base station for the permission based on at least one of the number of partner terminals with which the radio terminal is to perform the direct communication, the number of identifiers of addresses with which the radio terminal is to perform the direct communication, types of data to be transmitted, and traffic volume in the direct communication.

The controller may be configured to receive information as a positive acknowledgment to the request for the permission, the information indicating a radio resource used for data transmission to the plurality of addresses. The controller may be configured to transmit the request for the permission to the base station together with a buffer status report indicating volume of data transmittable by the direct communication.

A base station according to an embodiment may comprises a controller configured to receive a request for permission to transmit data to a plurality of addresses by direct communication from a radio terminal configured to transmit data to one address by direct communication within a predetermined period. The predetermined period is configured to include a period for transmitting control information used for the direct communication between radio terminals and a period for transmitting data corresponding to the control information. The controller determines whether to permit data transmission by the radio terminal to the plurality of addresses by the direct communication based on the request for the permission.

The controller may be configured to determine whether to permit data transmission to the plurality of addresses by the direct communication based on at least one of the number of partner terminals with which the radio terminal is to perform the direct communication, the number of identifiers of addresses with which the radio terminal is to perform the direct communication, types of data to be transmitted, and traffic volume in the direct communication.

The controller may be configured to transmit information as a positive acknowledgment to the request for the permission, the information indicating a radio resource used for data transmission to the plurality of addresses.

Embodiment (Mobile Communication System)

Hereinafter, an LTE system being a mobile communication system according to an embodiment will be described. FIG. 1 is a configuration diagram of an LTE system.

As shown in FIG. 1, the LTE system comprises UEs (User Equipments) 100, E-UTRAN (Evolved Universal Terrestrial Radio Access Network) 10, and EPC (Evolved Packet Core) 20. In addition, a server 400 is provided in an external network not managed by an operator of a cellular network.

The UE 100 corresponds to a radio terminal. The UE 100 is a mobile communication device, and performs radio communication with a connected cell (a serving cell). Configuration of the UE 100 will be described later.

The E-UTRAN 10 corresponds to a radio access network. The E-UTRAN 10 includes eNBs 200 (evolved Node-Bs). The eNB 200 corresponds to a base station. The eNBs 200 are connected mutually via an X2 interface. Configuration of the eNB 200 will be described later.

The eNB 200 manages a cell or a plurality of cells. The eNB 200 performs radio communication with the UE 100 that establishes a connection with the cell of the eNB 200. The eNB 200, for example, has a radio resource management (RRM) function, a function of routing user data (hereinafter, simply referred to as "data"), and a measurement control function for mobility control and scheduling. The "cell" is used as a term indicating a minimum unit of a radio communication area and may be also used as a term indicating a function of performing radio communication with the UE 100.

The EPC 20 corresponds to a core network. The EPC 20 comprises MME (Mobility Management Entity)/S-GW (Serving-Gateway) 300 and a P-GW (Packet Data Network Gateway) 350. The MME performs various mobility controls and the like, for the UE 100. The S-GW performs control to transfer user data. The MME/S-GW 300 is connected to the eNB 200 via an S1 interface. The E-UTRAN 10 and the EPC 20 constitute a network. A packet data network gateway (P-GW) 350 performs control of relaying (transferring) user data from the external network (and to the external network).

The Server 400 is a ProSe Application Server. In such a case, the Server 400 manages an identifier used in the ProSe. For example, the Server 400 stores an "EPC ProSe user ID" and a "ProSe function ID". Moreover, the Server 400 maps an "Application layer user ID" and the "EPC ProSe user ID".

Figure 2:
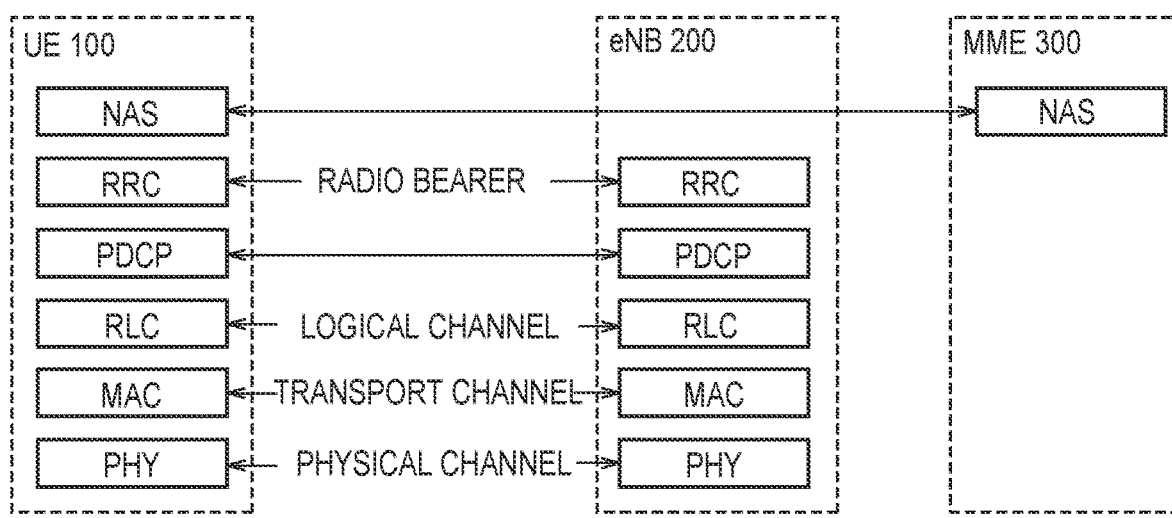
FIG. 2 is a view illustrating a protocol stack of a radio interface in the LTE system.

FIG. 2 is a protocol stack diagram of a radio interface in the LTE system. As shown in FIG. 2, the radio interface protocol is classified into a layer 1 to a layer 3 of an OSI reference model, and the layer 1 is a physical (PHY) layer. The layer 2 includes MAC (Medium Access Control) layer, RLC (Radio Link Control) layer, and PDCP (Packet Data Convergence Protocol) layer. The layer 3 includes RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data and a control signal are transmitted through the physical channel.

The MAC layer performs priority control of data, a retransmission process by hybrid ARQ (HARQ), a random access procedure, and the like. Between the MAC layer of the UE 100 and the MAC layer of the eNB 200, data and a control signal are transmitted via a transport channel. The MAC layer of the eNB 200 includes a scheduler to decide a transport format of an uplink and a downlink (a transport block size, a modulation and coding scheme (MCS)) and an allocated resource block to the UE 100.

The RLC layer transmits data to an RLC layer of a reception side by using the functions of the MAC layer and the PHY layer. Between the RLC layer of the UE 100 and the RLC layer of the eNB 200, data and a control signal are transmitted via a logical channel.

The PDCP layer performs header compression and decompression, and encryption and decryption.

The RRC layer is defined only in a control plane handling a control signal. Between the RRC layer of the UE 100 and the RRC layer of the eNB 200, a message (an RRC message) for various types of setting is transmitted. The RRC layer controls the logical channel, the transport channel, and the physical channel in response to establishment, re-establishment, and release of a radio bearer. When a connection (an RRC connection) is established between the RRC of the UE 100 and the RRC of the eNB 200, the UE 100 is in an RRC connected state (a connected state); otherwise, the UE 100 is in an RRC idle state (an idle state).

NAS (Non-Access Stratum) layer positioned above the RRC layer performs session management, mobility management and the like.

Figure 3:
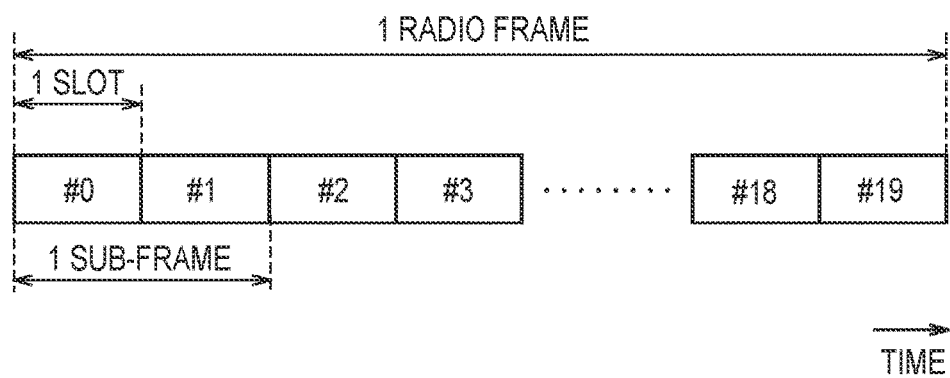
FIG. 3 is a configuration diagram illustrating a radio frame used in the LTE system.

FIG. 3 is a configuration diagram of a radio frame used in the LTE system. In the LTE system, OFDMA (Orthogonal Frequency Division Multiplexing Access) is employed in a downlink (DL), and SC-FDMA (Single Carrier Frequency Division Multiple Access) is employed in an uplink (UL), respectively.

As shown in FIG. 3, the radio frame is configured by 10 subframes arranged in a time direction. Each subframe is configured by two slots arranged in the time direction. Each subframe has a length of 1 ms, and each slot has a length of 0.5 ms. Each subframe includes a plurality of resource blocks (RBs) in a frequency direction and includes a plurality of symbols in the time direction. Each resource block includes a plurality of subcarriers in the frequency direction. A resource element (RE) is configured by one symbol and one subcarrier. In addition, among radio resources (time-frequency resources) allocated to the UE 100, a frequency resource is specified by a resource block and a time resource is specified by a subframe (or slot).

In the downlink, an interval of several symbols at the head of each subframe is a region mainly used as a physical downlink control channel (PDCCH) for transmission of a downlink control signal. The details of the PDCCH will be described later. Furthermore, the remaining part of each subframe is a region which can be mainly used as a physical downlink shared channel (PDSCH) for transmission of a downlink data.

In the uplink, both end portions in the frequency direction of each subframe are regions mainly used as a physical uplink control channel (PUCCH) for transmission of an uplink control signal. Furthermore, the remaining part of each subframe is a region which can be mainly used as a physical uplink shared channel (PUSCH) for transmission of an uplink data.

(Proximity Service)

The ProSe (Proximity-based Services) will be described below. In the ProSe, a plurality of UEs 100 transmit and receive various signals via a direct radio link not passing through an evolved Node-B (eNB) 200. The direct radio link in the ProSe will be referred to as a "sidelink".

The "sidelink" is a UE-to-UE interface for direct discovery and direct communication. The "sidelink" corresponds to a PC5 interface. The PC5 is a reference point between UEs that can use the ProSe used for control for UE-network relaying (transferring) using direct discovery, direct communication, and the ProSe, and for a user plane. The PC5 interface is a UE-to-UE interface in the ProSe.

As modes of the ProSe, two modes including "direct discovery" and "direct communication" are defined.

The direct discovery is a mode for searching for another UE by directly transmitting, between UEs, a discovery signal without a specified specific destination. In addition, the direct discovery is a procedure for discovering another UE in the neighborhood of the UE, using a direct radio signal in an Evolved Universal Terrestrial Radio Access (E-UTRA) via the PC5. Alternatively, the direct discovery is a procedure employed by the UE 100 that can execute the ProSe for discovering another UE 100 that can execute the ProSe, using only the capability of two UEs 100 based on the E-UTRA technique. The direct discovery is supported only if the UE 100 is provided with a service by the E-UTRAN (the eNB 200 (cell)). If the UE 100 is connected to the cell (the eNB 200) or exists in the cell, the service is provided by the E-UTRAN.

Resource allocation types for transmitting (announcement of) a discovery signal (discovery message) include a "type 1" in which the UE 100 selects a radio resource, and a "type 2 (type 2B)" in which the eNB 200 selects a radio resource.

A "Sidelink Direct Discovery" protocol stack includes a physical (PHY) layer, a medium access control (MAC)

layer, and a ProSe protocol. Between the PHY layer of a UE (A) and the PHY layer of a UE (B), a discovery signal is transmitted via a physical channel referred to as a physical sidelink discovery channel (PSDCH). Between the MAC layer of the UE (A) and the MAC layer of the UE (B), a discovery signal is transmitted via a transport channel referred to as a sidelink discovery channel (SL-DCH).

The direct communication is a mode for directly transmitting data between UEs by specifying a specific destination (destination group). In addition, the direct communication is communication performed between two or more UEs that can execute the ProSe, through user plane transmission that uses the E-UTRA technique via a route not passing through any network node.

Resource allocation types of the direct communication include a "mode 1" in which the eNB 200 specifies a radio resource of the direct communication, and a "mode 2" in which the UE 100 selects a radio resource of the direct communication.

A direct communication protocol stack includes a physical (PHY) layer, a MAC layer, a radio link control (RLC) layer, and a packet data convergence protocol (PDCP) layer. Between the PHY layer of the UE (A) and the PHY layer of the UE (B), a control signal is transmitted via a physical sidelink control channel (PSCCH), and data is transmitted via a physical sidelink shared channel (PSSCH). In addition, a synchronization signal and the like may be transmitted via a physical sidelink broadcast channel (PSBCH). Between the MAC layer of the UE (A) and the MAC layer of the UE (B), data is transmitted via a transport channel referred to as a sidelink shared channel (SL-SCH). Between the RLC layer of the UE (A) and the RLC layer of the UE (B), data is transmitted via a logical channel referred to as a sidelink traffic channel (STCH).

(Radio Resource Pool Used in Direct Communication)

Figure 4:
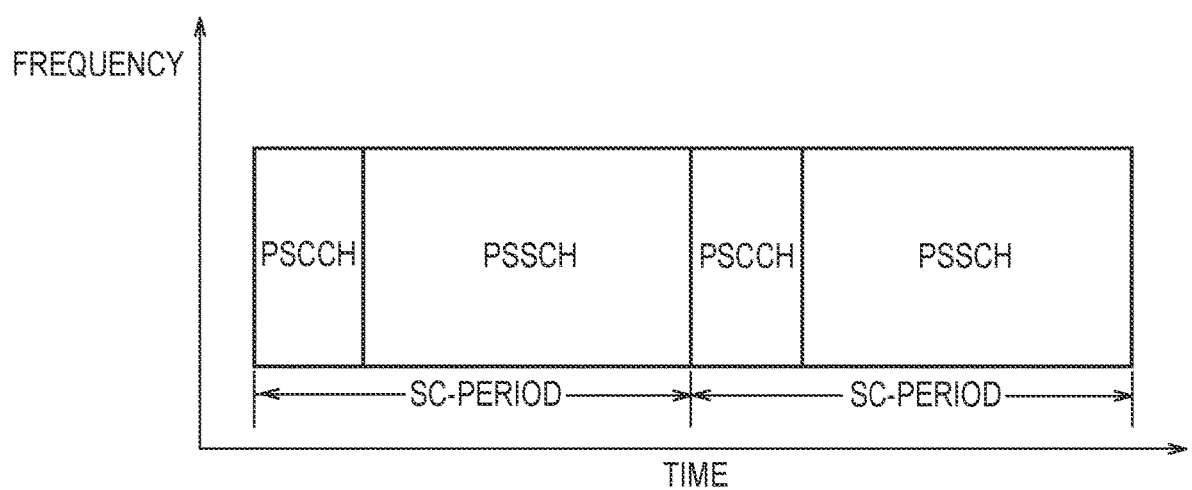
FIG. 4 is a view for describing a radio resource pool used in direct communication.

Hereinafter, a radio resource pool used in direct communication will be described with reference to FIG. 4. FIG. 4 is a view for describing the radio resource pool used in the direct communication.

As illustrated in FIG. 4, the radio resource pool (transmission resource pool/reception resource pool) used in the direct communication is repeatedly arranged in a time direction in a predetermined period (SC-period). The radio resource pool used in the direct communication includes a control area (physical sidelink control channel (PSCCH)) and a data area (physical sidelink shared channel (PSSCH)). A plurality of radio resource pools including the control area and the data area is arranged in the time direction. One radio resource pool has a length in the time direction equivalent to an SC-period, a period of the radio resource pool. One SC-period includes a period for transmitting control information used in the direct communication (SCI to be described later) and data corresponding to the control information. The control area and the data area are alternately arranged in the time direction. The data area follows the control area in the time direction. It should be noted that the data area may overlap with the control area in the time direction.

The control area is where the PSCCH for transmitting sidelink control information (SCI) by the direct communication is arranged. Therefore, the control area corresponds to a control resource pool in which a radio resource for transmitting the SCI by the direct communication (hereinafter referred to as a control resource) is arranged. The SCI is information for notifying a radio resource allocated for transmitting data by the direct communication (hereinafter referred to as a data resource). Specifically, the SCI includes allocation information of the data resource. The data area is where the PSSCH for transmitting data is arranged. Therefore, the data area corresponds to a data resource pool in which the radio resource for transmitting the data by the direct communication is arranged.

(UE-Network Relaying)

Figure 5:
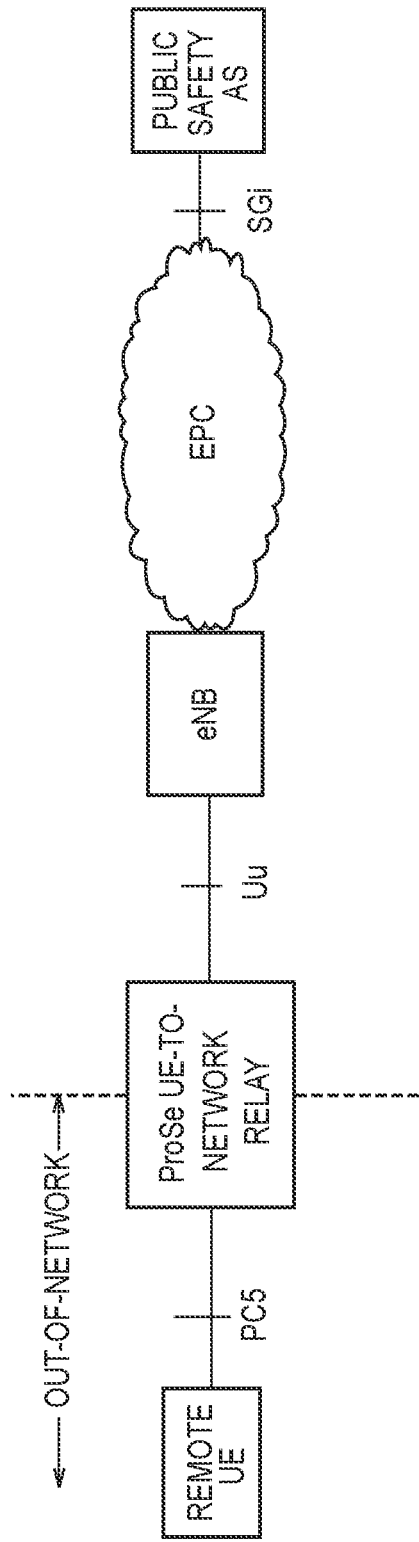
FIG. 5 is a view for describing UE/network relay according to an embodiment.

The UE-network relaying (transferring) will be described below using FIG. 5. FIG. 5 is a diagram for illustrating the UE-network relaying (transferring) according to an embodiment.

In FIG. 5, a remote UE is a UE located outside the network (Out of-Network). In other words, the remote UE is located outside the coverage of the cell. Note that the remote UE may be located inside the coverage of the cell. Thus, the remote UE is a UE 100 not provided with a direct service by the E-UTRAN 10 (i.e. a UE 100 that is not served by the E-UTRAN 10). In addition, the remote UE 100 can communicate with a packet data network (PDN) via a relay UE to be described later. The remote UE may be a UE for Public Safety (ProSe-enabled Public Safety UE).

In addition, the "ProSe-enabled Public Safety UE" has a configuration in which a HPLMN allows use for public safety. The "ProSe-enabled Public Safety UE" can use the ProSe, and supports procedures in the ProSe and a specific capability for public safety. For example, the "ProSe-enabled Public Safety UE" transmits information for public safety through the proximity service. The information for public safety includes, for example, information on disasters (such as earthquakes and fires), and information used by fire officials or police officials.

The remote UE is provided with the ProSe relay (transfer) service from the relay UE, as described later. The UE-network relay (transfer) is executed between the remote UE that is provided with the ProSe relay (transfer) service and the relay UE that provides the ProSe relay (transfer) service.

The relay UE (ProSe UE-to Network Relay) provides a ProSe relay (transfer) service for the remote UE. Specifically the relay UE provides service continuity of communication with the packet data network for the remote UE. Thus, the relay UE relays (transfers) data (unicast traffic) between the remote UE and the network. The relay UE relays (transfers) data (traffic) of the remote UE between the remote UE and the network using the ProSe (direct communication). More specifically, the relay UE relays (transfers) data (uplink traffic) received from the remote UE via the PC5 interface, to the eNB 200 via a Uu interface (LTE-Uu) or a Un interface (LTE-Un). In addition, the relay UE relays (transfers) data (downlink traffic) received from the eNB 200 via the Uu interface or the Un interface (LTE-Un), to the remote UE via the PC5 interface. The Relay UE is located only within the network (within the coverage of the cell).

In addition, the relay UE can provide a comprehensive function capable of relaying (transferring) traffic of an arbitrary type that is related to communication for public safety.

The relay UE and the remote UE can transmit data and control signals between the PHY layers. Similarly, the relay UE and the remote UE can transmit data and control signals between the MAC layers, the RLC layers, and the PDCP layers. Furthermore, the relay UE may have an IP relay (IP-Relay) layer as a higher layer of the PDCP layer. The remote UE may have an IP layer as a higher layer of the PDCP layer. The relay UE and the remote UE can transmit data and control signals between the IP relay layer and the IP layer. In addition, the relay UE can transmit data between the IP relay layer and the IP layer of the IP-GW 350.

It is noted that, in an AS layer (Access Stratum), the relay UE can transmit data (traffic) to the remote UE by using broadcast. In the AS layer, the relay UE may transmit data to the remote UE by using unicast. It is noted that if the UE-to-Network relay (transfer) is executed by using broadcast, a feedback in the AS layer is not performed, but a feedback in a NAS layer (Non Access Stratum) may be performed, between the relay UE and the remote UE. Further, if the UE-to-Network relay (transfer) is performed by using unicast, a feedback in the AS layer may be performed.

(Radio Terminal)

Figure 6:
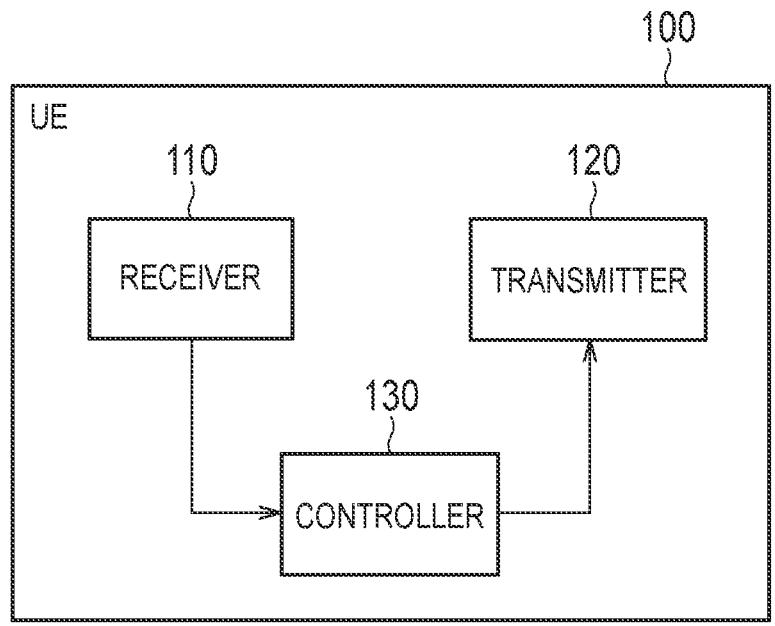
FIG. 6 is a block diagram of a UE 100.
Figure 7:
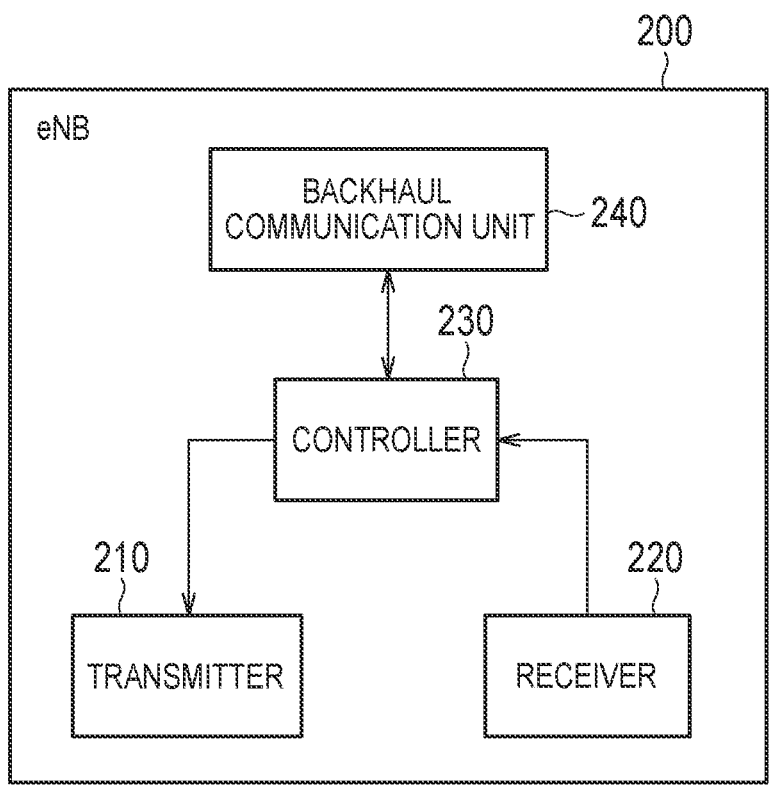
FIG. 7 is a block diagram of an eNB 200.

The UE 100 (radio terminal) according to the embodiment will be described below. FIG. 6 is a block diagram of the UE 100. As illustrated in FIG. 5, the UE 100 comprises a receiver 110, a transmitter 120, and a controller 130. The receiver 110 and the transmitter 120 may be integrated transceivers (transceivers).

The receiver 110 performs various types of reception under the control of the controller 130. The receiver 110 comprises an antenna. The receiver 110 converts a radio signal received by the antenna, into a baseband signal (reception signal), and outputs the baseband signal to the controller 130.

In addition, if the UE 100 is "ProSe-enabled Public Safety UE", the receiver 110 can simultaneously receive radio signals in two different frequencies. For example, the UE 100 comprises two receiving devices (2 RX Chain). The UE 100 can receive a radio signal for cellular using one receiving device, and can receive a radio signal for the ProSe using the other receiving device.

The transmitter 120 performs various types of transmission under the control of the controller 130. The transmitter 120 comprises an antenna and a transmission device. The transmission device converts a baseband signal (transmission signal) output by the controller 130, into a radio signal, and transmits the radio signal from the antenna.

The controller 130 performs various types of control in the UE 100. The controller 130 comprises a processor and a memory. The memory stores a program to be executed by the processor, and information to be used in processing performed by the processor. The processor comprises a baseband processor that performs modulation/demodulation and encoding/decoding of a baseband signal, and the like, and a central processing unit (CPU) that executes programs stored in the memory, to perform various types of processing. The processor may comprise a codec that performs encoding/decoding of an audio/video signal. The processor executes various types of processing to be described later and various types of communication protocols mentioned above.

The UE 100 may comprise a GNSS receiver. The GNSS receiver receives the GNSS signal and outputs the received signal to the controller 130 to obtain position information indicating the geographical position of the UE 100. Alternatively, the UE 100 may have a GPS function for acquiring the position information of the UE 100.

(Base Station)

The eNB 200 (base station) according to the embodiment will be described below. FIG. 6 is a block diagram of the eNB 200. As illustrated in FIG. 6, the eNB 200 comprises a transmitter 210, a receiver 220, a controller 230, and a backhaul communication unit 240. The transmitter 210 and the receiver 220 may be an integrated transceiver (transceiver).

The transmitter 210 performs various types of transmission under the control of the controller 230. The transmitter 210 comprises an antenna device. The transmitter converts a baseband signal (transmission signal) output by the controller 230, into a radio signal, and transmits the radio signal from the antenna.

The receiver 220 performs various types of reception under the control of the controller 230. The receiver 220 comprises an antenna and a receiving device. The receiving device converts a radio signal received by the antenna, into a baseband signal (reception signal), and outputs the baseband signal to the controller 230.

The controller 230 performs various types of control in the eNB 200. The controller 230 comprises a processor and a memory. The memory stores a program to be executed by the processor, and information to be used in processing performed by the processor. The processor comprises a baseband processor that performs modulation/demodulation and encoding/decoding of a baseband signal, and the like, and a central processing unit (CPU) that executes programs stored in the memory, to perform various types of processing. The processor executes various types of processing to be described later and various types of communication protocols mentioned above.

The backhaul communication unit 240 is connected to a neighboring eNB 200 via an X2 interface, and is connected to a MME/S-GW 300 via an S1 interface. The backhaul communication unit 240 is used for communication performed on the X2 interface, communication performed on the S1 interface, and the like.

(Operating Environment According to First Embodiment)

Figure 8:
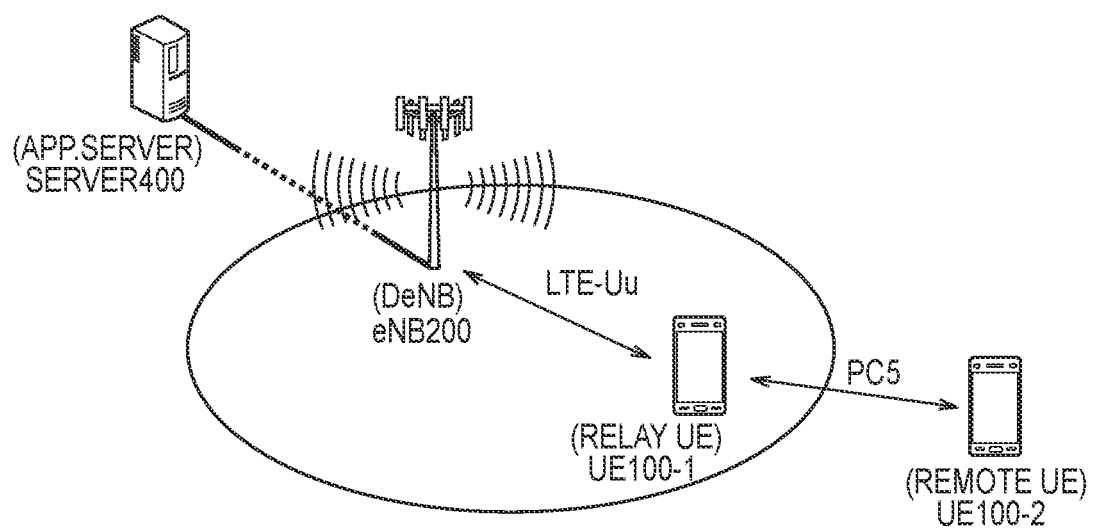
FIG. 8 is a view for describing an operating environment according to an embodiment.

Hereinafter, an operating environment according to a first embodiment will be described with reference to FIG. 8. FIG. 8 is a view for describing the operating environment according to the embodiment.

As illustrated in FIG. 8, a UE 100-1 is located inside a cell controlled by an eNB 200 (DeNB) and is capable of performing cellular communication (LTE-Uu) with the eNB 200. The UE 100-1 is in an RRC_CONNECTED state. Alternatively, the UE 100-1 may be in an RRC_IDLE state, and may shift from the RRC_IDLE state to the RRC_CONNECTED state if the UE 100-1 performs communication with the eNB 200. The UE 100-1 is a relay UE. On the other hand, a UE 100-2 is located outside the cell controlled by the eNB 200. The UE 100-2 is a remote UE which is in the RRC_IDLE state. The eNB 200 is a donor eNB that relays (transfers) data of the remote UE.

In such an operating environment, the following operations are performed in order to reduce signaling if UE/network relay (transfer) is performed.

The following processes (operations) to be executed by the UE 100 (UE 100-1/UE 100-2) are executed by at least one of a receiver 110, a transmitter 120, and a controller 130 included in the UE 100. However, for sake of simplicity, the following processes will be described as being executed by the UE 100. Similarly, the following processes (operations) to be executed by the eNB 200 are executed by at least one of a transmitter 210, a receiver 220, a controller 230, and backhaul communications 240 included in the eNB 200. However, for sake of simplicity, the following processes will be described as being executed by the eNB 200.

(Operations According to First Embodiment)

Figure 9:
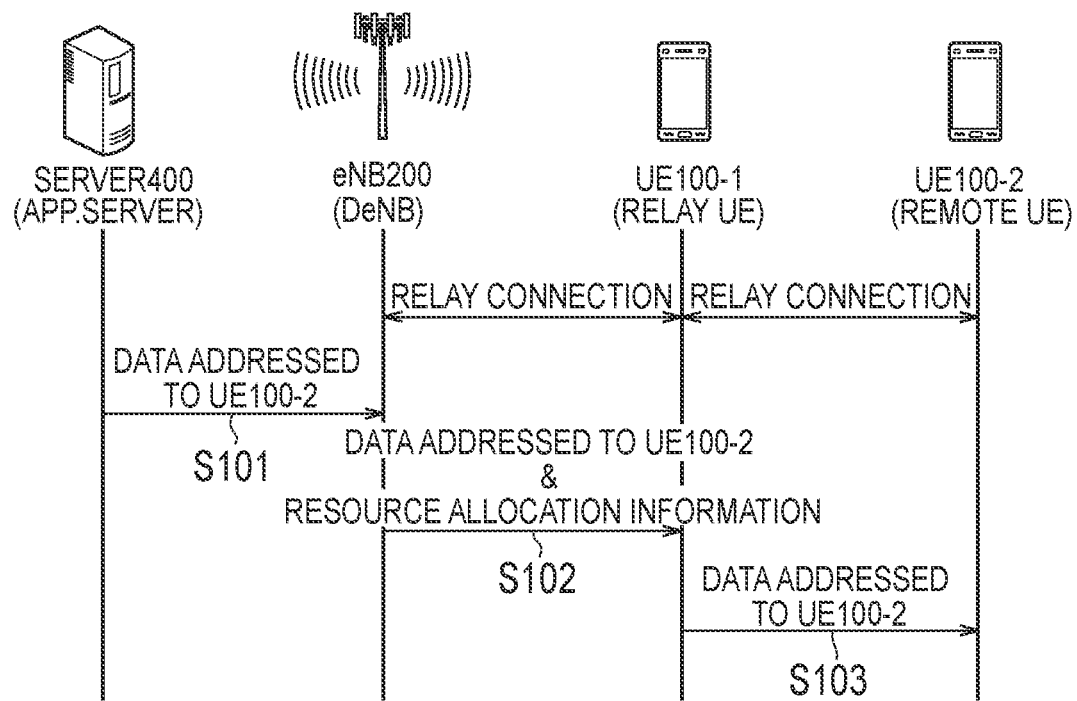
FIG. 9 is a sequence diagram for describing operations according to a first embodiment.

Hereinafter, operations according to the first embodiment will be described with reference to FIG. 9. FIG. 9 is a sequence diagram for describing operations according to the first embodiment.

As illustrated in FIG. 9, a connection for the UE/network relay (transfer) is established between the eNB 200 and the UE 100-1. A connection for the UE/network relay (transfer) is also established between the UE 100-1 and the UE 100-2.

In step S101, a server 400 transmits data for the UE 100-2 to the eNB 200. The eNB 200 receives the data.

In step S102, the eNB 200 transmits the data for the UE 100-2 to the UE 100-1 which is the relay UE of the UE 100-2. When transmitting the data, the eNB 200 herein also transmits allocation information of a radio resource for relaying (transferring) the data by the UE/network relay (transfer). When receiving the data, the UE 100-1 also receives the allocation information of the radio resource.

For example, the eNB 200 may transmit the allocation information of the radio resource together with the data to the UE 100-1 through a physical downlink shared channel (PDSCH). The UE 100-1 can receive the allocation information of the radio resource through the PDSCH. Furthermore, the eNB 200 may include the allocation information of the radio resource as MAC CE included in a MAC sub-header of the data. Therefore, the eNB 200 can embed the allocation information of the radio resource in the data (MAC PDU). It should be noted that the allocation information herein includes at least the radio resource for transmitting the data to be transmitted together with the allocation information.

The eNB 200 may change a timing for transmitting the allocation information of the radio resource for transmitting data generated on a network (that is, the data in S101) (hereinafter appropriately referred to as first allocation information) and a timing for transmitting the allocation information of the radio resource for transmitting the data for the UE 100-2 generated in the UE 100-1 (hereinafter appropriately referred to as second allocation information). Specifically, based on a sidelink buffer status report (SL-BSR) relating to sidelink data volume available for transmission in proximity-based services, the eNB 200 may transmit the data in S101 and the first allocation information to the UE 100-1 at the timing earlier than a timing for transmitting control information (SL DCI) including the second allocation information (SL grant) to the UE 100-1. The eNB 200 may transmit the first allocation information at a timing when a period from reception of the first allocation information to start of data transmission (a first period) becomes longer than a period from reception of the second allocation information to start of data transmission (a second period). Since the first period is longer than the second period, the UE 100-1 can decode the data and the first allocation information, leaving a margin. If the UE 100-1 receives the second allocation information, data corresponding to the second allocation information is generated in the UE 100-1 so that the UE 100-1 is not required to decode the data when receiving the second allocation information.

It should be noted that the eNB 200 can allocate the radio resource to the UE 100-1 in accordance with data volume received from the server 400. Therefore, the eNB 200 may not receive the SL-BSR relating to the data volume generated on the network. In other words, the UE 100-1 can omit transmission of the SL-BSR relating to the data received from the eNB 200.

In step S103, the UE 100-1 transmits the data to the UE 100-2 based on the allocation information of the radio resource received together with the data. The UE 100-2 receives the data from the UE 100-1.

The UE 100-1 can control sidelink data received from the eNB 200 (hereinafter appropriately referred to as first data) separately from sidelink data generated in the UE 100-1 (hereinafter appropriately referred to as second data). For example, the UE 100-1 may include a first buffer for storing the first data and a second buffer for storing the second data. The UE 100-1 can transmit the SL-BSR to the eNB 200 in order to report a status of the second buffer. Accordingly, the UE 100-1 can transmit the SL-BSR to the eNB 200 to report only second data volume without including first data volume in the second data volume. The UE 100-1 does not consider the first data as a trigger condition of the SL-BSR.

According to the above description, the UE 100-1 can omit the transmission of the SL-BSR relating to the data received from the eNB 200. Therefore, it is possible to reduce signaling.

(Modification)

Hereinafter, a modification according to the first embodiment will be described with reference to FIG. 10. FIG. 10 is a sequence diagram for describing the modification according to the first embodiment.

In this modification, the eNB 200 transmits data and information that permits data transmission to a plurality of addresses in one SC-period. It should be noted that descriptions of those similar to the first embodiment will be appropriately omitted in this modification.

As illustrated in FIG. 10, in step S201, the UE 100-1 transmits traffic related information to the eNB 200. The eNB 200 receives the traffic related information from the UE 100-1.

For example, the UE 100-1 may transmit the traffic related information to the eNB 200 if a connection for UE/network relay (transfer) is established. Alternatively, the UE 100-1 may transmit the traffic related information to the eNB 200 if the traffic related information is changed.

The traffic related information is information on at least one of the number of remote UEs, the number of identifiers of addresses being relaying (transferring) destination, types of data to be transmitted, and traffic volume in relay (transfer).

The number of remote UEs is the number of remote UEs relayed (transferred) by the UE 100-1. The identifiers of addresses where the traffic related information is to be relayed (transferred) may be address identifiers of the UE 100-2 or may be, for example, group identifiers. The types of data to be transmitted may be, for example, types of priority of data (for example, High and Low), or types of data (for example, voice data and document data). The traffic volume in the UE/network relay (transfer) may be traffic volume transmitted to each relay UE, traffic volume received from each relay UE, and the total traffic volume of the traffic volume received from each relay UE and the traffic volume transmitted to each relay UE.

Step S202 corresponds to step S101.

In step S203, the eNB 200 determines whether there is a margin for traffic relating to the UE/network relay (transfer). The eNB 200 performs determination based on the traffic related information. For example, if the number of remote UEs is equal to or less than a threshold, the eNB 200 determines that there is a margin for traffic. If the number of types of data to be transmitted is equal to or less than a threshold, the eNB 200 may determine that there is a margin for traffic. If the traffic volume in the UE/network relay (transfer) is equal to or less than a threshold, the eNB 200 may determine that there is a margin for traffic.

If the eNB 200 determines that there is a margin for traffic, the eNB 200 does not permit data transmission to the plurality of addresses within one SC-period.

It should be noted that the eNB 200 may perform determination if the eNB 200 receives data for a relay UE which is to be transmitted to the UE 100-1, or may perform determination if the eNB 200 receives the traffic related information.

Steps S204 and S205 correspond to steps S102 and S103. Step S206 corresponds to step S101.

In step S207, as similar to step 203, the eNB 200 determines whether there is a margin for traffic relating to the UE/network relay (transfer). Hereinafter, suppose that the eNB 200 determines that there is no margin for traffic. Therefore, it is assumed that the eNB 200 determines to allow data transmission to the plurality of addresses within one SC-period.

In step S208, when transmitting the data for the UE 100-2 to the UE 100-1, the eNB 200 also transmits, to the UE 100-1, permission information that permits data transmission to the plurality of addresses within one SC-period. The eNB 200 can transmit the permission information together with the data as similar to the case of transmitting the allocation information of the radio resource. The UE 100-1 also receives the permission information together with the data.

The permission information may be allocation information (a plurality of allocation information) of radio resources used for data transmission to the plurality of addresses. The permission information may be flag information indicating permission for data transmission to the plurality of addresses within one SC-period.

In step S209, the UE 100-1 transmits the data to the plurality of addresses including the UE 100-2 within one SC-period.

It should be noted that the UE 100-1 may transmit a plurality of control information (SCI) including control information corresponding to the plurality of allocation information (a plurality of data resources) in the control area within one SC-period. One SCI of the plurality of SCI indicates a data resource for transmitting the first data to be transmitted to the UE 100-2, and the remaining SCI of the plurality of SCI indicates a data resource for transmitting the data to be transmitted to remote UEs other than the UE 100-2. The UE 100-1 may also transmit one piece of control information corresponding to the plurality of allocation information. In this case, the control information includes a plurality of address identifiers. It should be noted that a remote UE monitors a data resource if the control information includes an address identifier addressed to the remote UE itself (or a group to which the remote UE belongs).

In this manner, in the data area within one SC-period, based on the plurality of allocation information, the UE 100-1 not only transmits the data for the UE 100-2 to the UE 100-2, but also transmits the data to other addresses. This makes it possible to prevent a transmission delay of the date for the UE 100-2 as compared with, for example, a case where the data is transmitted in an SC-period after the SC-period in which data for other relay UEs is transmitted.

Based on the traffic related information, the eNB 200 can determine whether to permit data transmission to the plurality of addresses within one SC-period. Therefore, even if the eNB 200 cannot determine whether the data generated on the network is addressed to a plurality of relay UEs, traffic for a plurality of remote UEs is transmitted to a relay UE by one bearer (at least one of RPS bearer, radio bearer, and LCID) so that the eNB 200 can determine whether to permit data transmission to the plurality of addresses within one SC-period.

It should be noted that the eNB 200 may transmit, for example, cancellation information for canceling permission to the UE 100-1 based on the traffic related information from the UE 100. Based on the cancellation information, the UE 100-1 may transmit data only to one address within one SC-period. Alternatively, the permission information may be information indicating permission for data transmission to the plurality of addresses only in one SC-period. In this case, the UE 100-1 may transmit the data to the plurality of addresses only in one SC-period, and then resume data transmission to one address within one SC-period.

Second Embodiment

Hereinafter, a second embodiment will be described with reference to FIG. 11. FIG. 11 is a sequence diagram for describing operations according to the second embodiment.

In the second embodiment, an eNB 200 permits data transmission to a plurality of addresses within one SC-period in response to a request from a UE 100-1. It should be noted that descriptions of those similar to the first embodiment and the modification will be appropriately omitted in this embodiment.

As illustrated in FIG. 11, steps S301 to S303 correspond to steps S101 to S103.

In step S304, the UE 100-1 determines whether a transmission delay occurs if there is data to be transmitted to the plurality of addresses. For example, the UE 100-1 determines whether a transmission delay occurs in a current radio resource (allocated resource) allocated from the eNB 200. For example, the UE 100-1 determines whether there is data for which a predetermined time has elapsed since data was generated or received from the eNB 200. If the UE 100-1 determines that a transmission delay occurs, the UE 100-1 executes the process in step S305.

As similar to the first embodiment, the UE 100-1 may determine whether a transmission delay occurs based on traffic related information.

In step S305, the UE 100-1 requests the eNB 200 for permission to transmit the data to the plurality of addresses within one SC-period. For example, the UE 100-1 transmits permission request information (multiple-address simultaneous transmission request) to the eNB 200. The UE 100-1 may transmit the permission request information, MAC CE, to eNB 200, or may transmit the permission request information by SLUE information message. The UE 100-1 may transmit the permission request information together with SL-BSR. The permission request information may be included in the SL-BSR.

The UE 100-1 may transmit flag information indicating a permission request as the permission request information. The UE 100-1 may transmit address identifiers indicating transmission targets within one SC-period together with the permission request information. The UE 100-1 may also transmit rate information indicating a rate of buffer quantity for each address to the total buffer quantity, together with the permission request information. The UE 100-1 may also transmit the traffic related information to the eNB 200 together with the permission request information.

Furthermore, if the UE 100-1 itself is a relay UE, the UE 100-1 may request the eNB 200 for permission to transmit the data to the plurality of addresses within one SC-period. This is because a remote UE can receive data only from a relay UE, which may cause a transmission delay.

In response to reception of the permission request information, the eNB 200 determines whether to permit data transmission to the plurality of addresses within one SC-period. The eNB 200 may determine whether to give permission in a manner similar to the first embodiment. The eNB 200 may determine whether to give permission based on the buffer quantity included in the SL-BSR. For example, the eNB 200 may permit data transmission to the plurality of addresses within one SC-period if the buffer quantity is equal to or larger than a threshold. Furthermore, if the UE 100-1 is a relay UE, the eNB 200 may permit data transmission to the plurality of addresses within one SC-period.

Steps S306 to S308 correspond to steps S206, S208, and S209. As illustrated in step S307, the eNB 200 may transmit, to the UE 100-1, allocation information of a radio resource (a plurality of allocation information) used for data transmission to the plurality of addresses as a response to the permission request. Herein, the eNB 200 can allocate the radio resource to the UE 100-1 based on the information received together with the permission request information (the address identifiers, rate information, traffic related information, and the like).

As described above, the eNB 200 determines whether to permit data transmission to the plurality of addresses within one SC-period based on the request from the UE 100-1. Accordingly, even if the eNB 200 cannot determine whether the data generated on the network is addressed to a plurality of relay UEs, traffic for a plurality of remote UEs is transmitted to a relay UE by one bearer (at least one of RPS bearer, radio bearer, and LCID) so that the eNB 200 can determine whether to permit data transmission to the plurality of addresses within one SC-period based on the permission request information from the UE 100-1.

Other Embodiments

While the content of the present application has been described in accordance with the aforementioned embodiments, it should be understood that the descriptions and drawings included as a part of this disclosure do not limit the content of the present application. Based on this disclosure, it is clear to those skilled in the art that various alternative embodiments, Examples, and operational techniques may be employable.

In the second embodiment, the UE 100-1 has been described as a relay UE, but the present invention is not limited thereto. Even if the UE 100-1 is not executing UE/network relay (transfer), the UE 100-1 may request the eNB 200 for permission to transmit data to a plurality of addresses within one SC-period. For example, if the UE 100-1 is performing direct communication, the UE 100-1 may request the eNB 200 for the permission. As similar to the aforementioned traffic related information, the UE 100-1 can request the eNB 200 for permission based on at least one of the number of partner UEs with which the UE 100-1 is to perform the direct communication, the number of identifiers of addresses with which the UE 100-1 is to perform the direct communication, types of data to be transmitted, and traffic volume in the direct communication.

In each of the aforementioned embodiments, the eNB 200 has been described to allocate a radio resource used in proximity-based services (UE/network relay (transfer)/direct communication) to the UE 100-1, but the present invention is not limited thereto. A UE (for example, a cluster head UE) may allocate a radio resource used in the proximity-based services (UE/network relay (transfer)/direct communication) to the UE 100-1 (relay UE). The cluster head UE, a UE that controls the proximity-based services, is capable of allocating the radio resource used in the proximity-based services (UE/network relay (transfer)/direct communication) to each UE (relay UE and the like). The cluster head UE can perform operations similar to those performed by the eNB 200.

Although not particularly mentioned in the each above-described embodiment, a program for causing a computer to execute each process performed by any one of the above-described each node (the UE 100, the eNB 200 and the like) can be provided. Furthermore, the program may be recorded on a computer-readable medium. When the computer-readable medium is used, it is possible to install the program in a computer. Here, the computer-readable medium for recording the program may be a non-transitory recording medium. The non-transitory recording medium is not particularly limited. For example, the non-transitory recording medium may include a recording medium such as a CD-ROM or a DVD-ROM.

Alternatively, a chip may be provided which is configured by: a memory configured to store a program for performing each process performed by any one of the UE 100 and eNB 200; and a processor configured to execute the program stored in the memory.

In the described-above embodiment, although an LTE system is described as an example of a mobile communication system, the present invention is not limited to the LTE system and may be applied to a system other than the LTE system.

The entire contents of Japanese Patent Application No. 2015-158904 (filed on Aug. 11, 2015) are incorporated in the specification of the present application by reference.

The invention claimed is:

1. A radio terminal configured to perform direct communication with another radio terminal, the radio terminal comprising:
   a controller configured to
      receive first data addressed to said another radio terminal from a base station,
      receive, along with the first data, first information indicating a first radio resource, and
      transmit the first data to said another radio terminal by using the first radio resource, through the direct communication, wherein
   the controller is configured to receive, from the base station, second information indicating a second radio resource configured to be used for transmitting second data addressed to said another radio terminal,
   the second data is configured to be generated in the radio terminal,
   the first information is configured to be transmitted by the base station at a timing when a first period configured by the base station is to be longer than a second period configured by the base station,
   the first period is a period from a time of receiving, by the radio terminal, the first information to a time of starting transmission of the first data by the radio terminal, and
   the second period is a period from a time of receiving, by the radio terminal, the second information to a time of starting transmission of the second data by the radio terminal.

2. The radio terminal according to claim 1, wherein the controller is configured to receive, from the base station, the first information and the first data, through a physical downlink shared channel.

3. The radio terminal according to claim 1, wherein the controller is configured to receive, from the base station, along with the first data, permission information,
   wherein the controller is configured to transmit the first data to a plurality of addresses through the direct communication within a predetermined period indicated in the received permission information, and wherein the predetermined period includes a period for transmitting control information of transmission of the first data and a period for transmitting the first data corresponding to the control information.

4. The radio terminal according to claim 3, wherein the permission information is third information indicating a third radio resource, and the controller is configured to transmit the first data by using the third radio resource, to the plurality of addresses.

5. The radio terminal according to claim 3, wherein, before receiving the permission information, the controller transmits, to the base station, at least one of the number of said another radio terminal, the number of identifiers of addresses being transferring destination, types of data to be transferred, and traffic volume related to transfer.

6. The radio terminal according to claim 1, wherein the controller transmits a buffer status report to the base station, the buffer status report indicating volume of data transmittable by the direct communication to said another radio terminal, and the controller does not include volume of the first data received from the base station in the volume of data transmittable by the direct communication.

7. A base station comprising:
a controller configured to
    transmit first data to a first radio terminal, the first data being addressed to a second radio terminal capable of performing direct communication with the first radio terminal, and
    transmits, along with the data, first information on a first radio resource by which the first radio terminal transmits the first data to the second radio terminal through the direct communication, wherein
the controller is configured to transmit, to the first radio terminal, second information indicating a second radio resource configured to be used by the first radio terminal for transmitting second data addressed to the second radio terminal,
the second data is configured to be generated in the first radio terminal,
the first information is configured to be transmitted by the base station at a timing when a first period configured by the base station is to be longer than a second period configured by the base station,
the first period is a period from a time of receiving, by the first radio terminal, the first information to a time of starting transmission of the first data by the first radio terminal, and
the second period is a period from a time of receiving, by the second radio terminal, the second information to a time of starting transmission of the second data by the first radio terminal.

8. The base station according to claim 7, wherein the controller is configured to transmit, to the first radio terminal, along with the data, permission information that controls the first radio terminal to transmit the first data to a plurality of addresses within a predetermined period,
wherein the predetermined period includes a period for transmitting control information of the direct communication and a period for transmitting first data corresponding to the control information.

9. The base station according to claim 8, wherein the controller receives, from the first radio terminal, at least one of the number of the second radio terminal, the number of identifiers of addresses being transferring destination, types of data to be transferred, and traffic volume related to transfer, and the controller transmits the permission information.

* * * * *